(12) United States Patent
Mitsuta et al.

(10) Patent No.: US 12,173,699 B2
(45) Date of Patent: Dec. 24, 2024

(54) ELECTROCHEMICAL COMPRESSOR

(71) Applicant: HONDA MOTOR CO., LTD., Tokyo (JP)

(72) Inventors: Naoki Mitsuta, Saitama (JP); Akihiro Noda, Saitama (JP)

(73) Assignee: HONDA MOTOR CO., LTD., Tokyo (JP)

( * ) Notice: Subject to any disclaimer, the term of this patent is extended or adjusted under 35 U.S.C. 154(b) by 416 days.

(21) Appl. No.: 17/457,427

(22) Filed: Dec. 2, 2021

(65) Prior Publication Data

US 2022/0178356 A1 Jun. 9, 2022

(30) Foreign Application Priority Data

Dec. 3, 2020 (JP) .................................. 2020-200703

(51) Int. Cl.
*F03G 7/00* (2006.01)
*C25B 1/02* (2006.01)
(Continued)

(52) U.S. Cl.
CPC .............. *F03G 7/0254* (2021.08); *C25B 1/02* (2013.01); *C25B 9/05* (2021.01); *C25B 9/07* (2021.01);
(Continued)

(58) Field of Classification Search
CPC .... C25B 1/02; C25B 1/04; C25B 9/00; C25B 9/05; C25B 9/07; C25B 9/17; C25B 9/19;
(Continued)

(56) References Cited

U.S. PATENT DOCUMENTS 7,879,207 B2 * 2/2011 Dalton ...................... C25B 1/04
204/253
8,679,305 B2 * 3/2014 Nakazawa ................ C25B 1/04
204/266
(Continued)

FOREIGN PATENT DOCUMENTS

| CN | 101818357 A | 9/2010 |
| JP | 2008121086 A | 5/2008 |
| JP | 2015113497 A | 6/2015 |

OTHER PUBLICATIONS

Han et al. "Performance and flow characteristics of large-sized PEM fuel cell having branch channel" International Journal of Hydrogen Energy 40 (2015) 4819-4829 (Year: 2015).*

(Continued)

*Primary Examiner* — Luan V Van
*Assistant Examiner* — Alexander R. Parent
(74) *Attorney, Agent, or Firm* — CKC & Partners Co., LLC (57) ABSTRACT

The present disclosure is intended to prevent blockage of a path that allows a fluid to flow to a predetermined position where a pressure of the fluid is applied to a cell unit. An electrochemical compressor according to an embodiment includes first and second members, an elastic body, a fluid chamber, and a fluid path. The elastic body exerts an elastic force in a direction in which the first member and the second member are pushed apart from each other, and thereby presses a stack of electrochemical cells. The fluid chamber has the elastic body disposed therein and receives boosted gas flowing thereinto, the fluid chamber allowing the boosted gas to apply a pressure to push the first member and the second member apart from each other. The fluid path connects the fluid chamber to a flow path into which the boosted gas is discharged from the electrochemical cells.

4 Claims, 6 Drawing Sheets

(51) Int. Cl.
    *C25B 1/04*         (2021.01)
    *C25B 9/05*         (2021.01)
    *C25B 9/07*         (2021.01)
    *C25B 9/60*         (2021.01)
    *C25B 9/77*         (2021.01)

(52) U.S. Cl.
    CPC .................. *C25B 9/60* (2021.01); *C25B 9/77* (2021.01); *F03G 7/011* (2021.08); *C25B 1/04* (2013.01)

(58) Field of Classification Search
    CPC .... C25B 9/23; C25B 9/30; C25B 9/60; C25B 9/70; C25B 9/73; C25B 9/75; C25B 9/77; F03G 7/0254
    USPC ................................................. 205/338, 637
    See application file for complete search history.

(56) References Cited

U.S. PATENT DOCUMENTS

| | | | |
|---|---|---|---|
| 11,952,671 B2 * | 4/2024 | Ukai | B01D 53/326 |
| 2010/0213051 A1 | 8/2010 | Ishikawa et al. | |
| 2023/0227987 A1 * | 7/2023 | Kakuwa | C25B 9/05 |
| | | | 204/258 |
| 2023/0227990 A1 * | 7/2023 | Kita | C25B 15/08 |
| | | | 204/295 |

OTHER PUBLICATIONS

Office Action issued Jul. 31, 2024 in the CN Patent Application No. 202111295664.1.

* cited by examiner

ELECTROCHEMICAL COMPRESSOR

This application is based on and claims the benefit of priority from Japanese Patent Application No. 2020-200701, filed on 3 Dec. 2020, the content of which is incorporated herein by reference.

BACKGROUND OF THE INVENTION

Field of the Invention

The present disclosure relates to an electrochemical compressor.

Related Art

Known examples of methods for increasing, i.e., boosting a pressure of a gas such as hydrogen include compressing the gas using a mechanical compressor and compressing the gas by electrochemically moving hydrogen through a solid polymer electrolyte membrane. A cell unit is used in the latter case. The cell unit electrically converts hydrogen supplied to the anode-side electrode into hydrogen ions. The hydrogen ions move through the solid polymer electrolyte membrane, and then, combine with electrons at the cathode-side electrode, whereby the hydrogen ions are converted into hydrogen. In other words, electricity moves hydrogen from one surface to the opposite surface of the solid polymer electrolyte membrane. When the side to which hydrogen lies been moved is directly connected to, for example, a tank, the gas has nowhere to go and is compressed to a high-pressure gas. To increase an amount of the gas to move, i.e., to increase a pressure rise rate, a plurality of such cell units are stacked.

During a process using the stack of cell units described above, the cells are likely to open due to the pressure increased by the cells themselves. Therefore, a pressing force is applied in the stacking direction to overcome the increased pressure, so that stable electrolysis performance can be achieved. In general, it is necessary to clamp the cells with a force greater than the high pressure generated by the cells themselves. Meanwhile, there is a known piston structure for use in a differential pressure-type water electrolysis apparatus. The piston structure generates and transmits a pressure in a direction in which cells ire pressed. The piston presses cell units by means of an elastic force exerted by a Belleville spring or the like and a pressure of a high-pressure hydrogen gas generated by the cell units. Therefore, even when a high-pressure gas is to be produced, it is unnecessary to hold the stack of cells under a high load greater than the pressure of the high-pressure gas, whereby breakage of the components of the water electrolysis apparatus can be inhibited.

SUMMARY OF THE INVENTION

The piston disclosed in Patent Document 1 includes, in its interior, paths and spaces where the high-pressure gas flows and the Belleville springs for generating the elastic force. In a space where the Belleville spring is disposed, the Belleville spring and a contact surface with which the Belleville spring contacts may block the space and prevent the high-pressure gas from flowing to the center of the Belleville spring. Since the interior of the piston has several spaces where Belleville springs are disposed, such blockage disrupts balance between amounts of the high-pressure gas flowing into the spaces, so that load applied by the piston is unevenly distributed to cause a load imbalance in the piston surface. This situation makes it impossible to press the cell units properly.

The present disclosure is intended to provide an electrochemical compressor capable of preventing blockage of a path that allows a fluid to flow to a predetermined position where a pressure of the fluid is applied to a cell unit.

A piston of an electrochemical compressor of an embodiment includes a first member, a second member, an elastic body, a fluid chamber, and a first fluid path. The second member faces the first member. The elastic body exerts an elastic force in the direction in which the first member end the second member are pushed apart from each other, and thereby presses a stack or electrochemical cells in each of which a gas supplied thereto is boosted by being moved by electricity from one side to an opposite side of a solid polymer, electrolyte membrane as a partition wall. The fluid chamber has the elastic body disposed therein and receives the boosted gas flowing thereinto, the fluid chamber allowing the boosted gas to apply a pressure in the direction in which the first member and the second member are pushed apart from each other. The first fluid path is formed on at least one of the first member or the second member, and connects the fluid chamber to a flow path into which the boosted gas is discharged from the electrochemical cells. At least one of the first member or the second member introduces the boosted gas into an interior thereof such that the stack of electrochemical cells is pressed by means of the pressure of the boosted gas.

The embodiment of the present disclosure can prevent blockage of the path that allows a fluid to flow to a predetermined position where a pressure of the fluid is applied to the cell units.

DETAILED DESCRIPTION OF THE INVENTION

Figure 1:
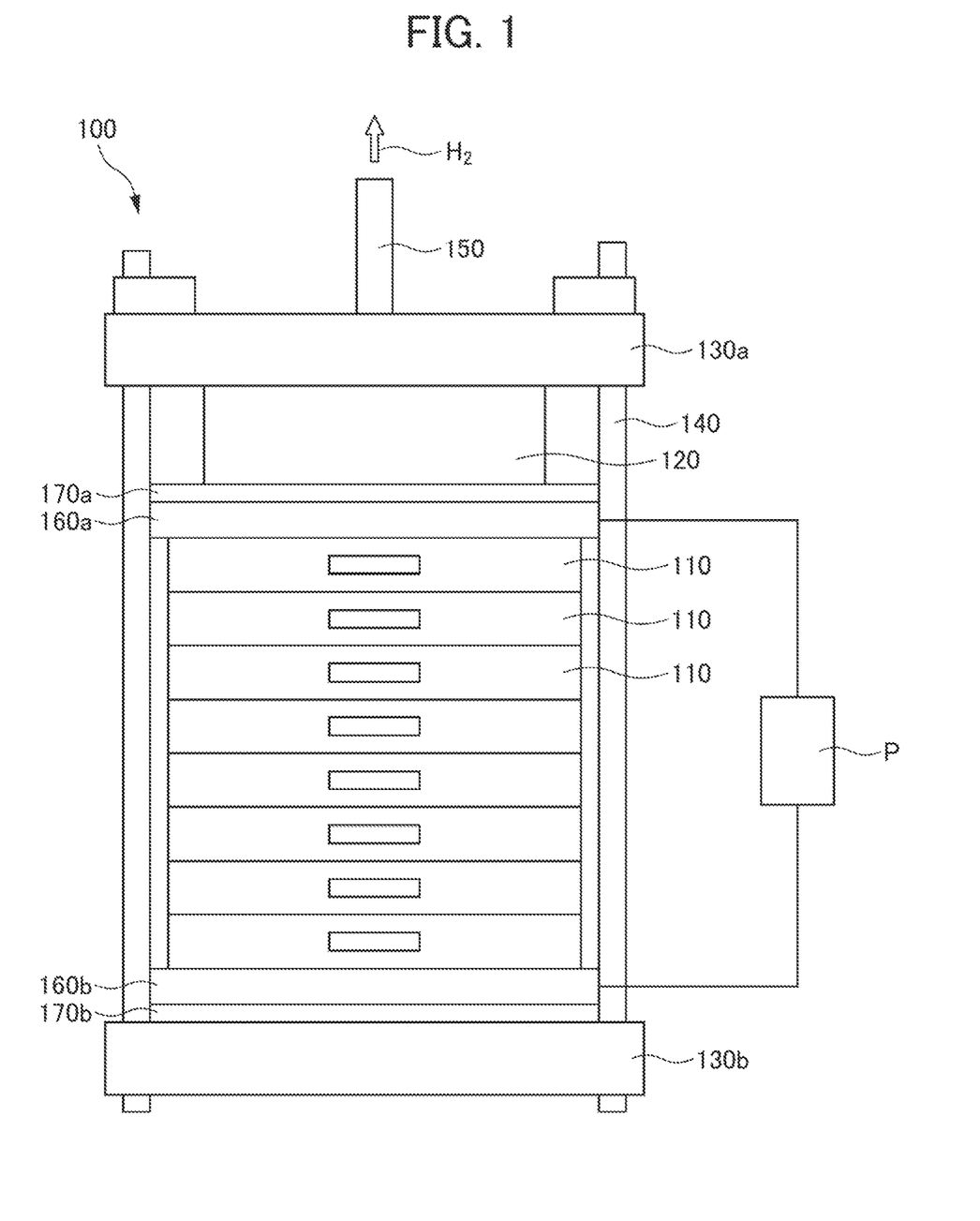
FIG. 1 is a side view illustrating, as an example, the appearance of an electrochemical hydrogen compressor according to a first embodiment.

An electrochemical hydrogen compressor according to an embodiment will be described below with reference to the drawings. The drawings to which reference will be made in the following description of the embodiment may illustrate components on an appropriately modified scale. In the drawings to which reference will be made in the following description of the embodiment, a portion of a configuration may be omitted or illustrated in a simplified manner, for the sake of convenience. In the drawings and the present specification, the same reference character denotes the same or similar element. FIG. 1 is a side view illustrating, as an example, the appearance of an electrochemical hydrogen compressor 100 according to the embodiment.

The electrochemical hydrogen compressor 100 is an apparatus configured to increase a pressure of hydrogen. The electrochemical hydrogen compressor 100 includes, for example, a plurality of cell units 110, a piston unit 120, a top plate 130a, a bottom plate 130b, a tie rod 140, a high-pressure hydrogen outlet 150, two end plates 160, and two insulation plates 170. The electrochemical hydrogen compressor 100 is an example of an electrochemical compressor.

The cell units 110, the piston unit 120, the top plate 130a, and the bottom plate 130b illustrated in FIG. 1 each have a substantially circular column shape, but may have another shape such as a prism shape. The bottom plate 130b, the plurality of cell units 110, the piston unit 120, and the top plate 130a are stacked in this order.

Each of the cell units 110 electrochemically moves hydrogen from one side to an opposite side of an electrolyte membrane. The hydrogen moved in the cell unit 110 is boosted to reach a high pressure of, for example, about 1 MPa to about 90 MPa. The cell unit 110 is similarly configured when it is applied to a fluid production apparatus using water electrolysis or a pressurization apparatus using water electrolysis. The cell unit 110 will be described in more detail later. The cell unit 110 is an example of an electrochemical cell.

The piston unit 120 presses the cell units 110. The piston unit 120 has, for example, a circular column shape. The piston unit 120 will be described in more detail later.

The top plate 130a and the bottom plate 130b are members having a circular column shape and are disposed to sandwich the cell units 110 and the piston unit 120 therebetween. In the following description of the embodiment, the side adjacent to the top plate 130a is defined as the top side of the electrochemical hydrogen compressor 100. The side adjacent to the bottom plate 130b is defined as the bottom side of the electrochemical hydrogen compressor 100.

The tie rod 140 holds the bottom plate 130b, the plurality of cell units 110, the piston unit 120, and the top plate 130a by clamping and tightening them.

The high-pressure hydrogen outlet 150 is a pipe for guiding hydrogen boosted by the electrochemical hydrogen compressor 100 to a hydrogen tank or the like provided outside the electrochemical hydrogen compressor 100.

The electrochemical hydrogen compressor 100 is provided with the two end plates 160 including an end plate 160a and an end plate 160b. The end plate 160a and the end plate 160b sandwich therebetween the plurality of cell units 110 in the vertical direction. Thu end plates 160 are provided with terminals for connection to an external power supply P. The end plates 160 each have one surface in contact with the stack of cell units 110 sandwiched therebetween, and the opposite surface on which a corresponding one of the insulation plates 170 is disposed. This configuration prevents leakage of electricity to the outside. The insulation plates 170 may be provided in the form of a paint or a film as long as they have insulating properties.

The electrochemical hydrogen compressor 100 is provided with the two insulation plates 170 including an insulation plate 170a and an insulation plate 170b. The insulation plate 170a and the insulation plate 170b are disposed to sandwich therebetween the plurality of cell units 110 and the two end plates 160 in the vertical direction. The insulation plates 170 are each disposed in contact with a corresponding one of the end plates 160, so that leakage of electricity to the outside of the end plates 160 is prevented. Each insulation plate 170 is, for example, a circular insulating plate. Alternatively, each insulation plate 170 may be provided as an insulating film or an insulating paint.

Figure 2:
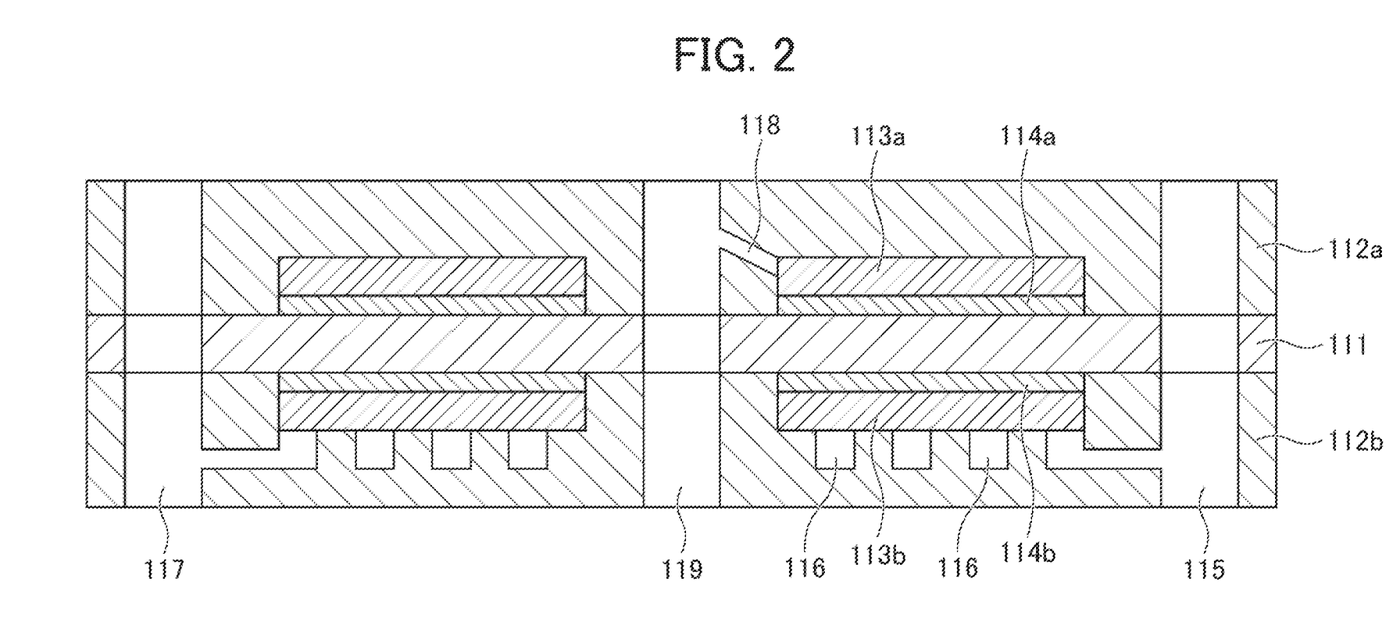
FIG. 2 is an axial cross-sectional view illustrating the cell unit in FIG. 1, as an example.

The cell unit 310 will be described in more detail with reference to FIG. 2. FIG. 2 is an axial cross-sectional view illustrating the cell unit 110 as an example. The cell unit 110 includes, for example, an electrolyte membrane 111, a cathode-side separator 112a, an anode-side separator 112b, a cathode-side power feeder 113a, an anode-side power feeder 113b, a cathode-side catalyst 114a, an anode-side catalyst 114b, a normal-pressure hydrogen supply path 115, a normal-pressure hydrogen flow path 116, a normal-pressure hydrogen discharge path 117, a high-pressure hydrogen discharge path 118, and a high-pressure hydrogen flow path 119.

The electrolyte membrane 111 is, for example, a cation-exchange type solid polymer electrolyte membrane including a perfluorosulfonic acid polymer. The electrolyte membrane 111 has, for example, a circular shape.

The cathode-side separator 112a and the anode-side separator 112b are stacked with the electrolyte membrane 111 sandwiched therebetween. The cathode-side separator 112a and the anode-side separator 112b are each constituted by, tor example, a carbon member. Alternatively, each of the cathode-side separator 112a and the anode-side separator 112b may be a steel plate, a stainless-steel plate, a titanium plate, an aluminum plate, a plated steel plate, or a metal plate having a metal surface subjected to anti-corrosive surface treatment. The cathode-side separator 112a and the anode-side separator 112b have, for example, a circular column shape. For example, the cathode-side separator 112a is stacked on top of the electrolyte membrane 111. The anode-aide separator 112b is disposed opposite to the cathode side and stacked below the electrolyte membrane 111.

The cathode-side power feeder 113a and the anode-side power feeder 113b are each constituted by, for example, a sintered compact of spherical atomized titanium powder (porous conductor). For example, each of the cathode-side power feeder 113a and the anode-side power feeder 113b includes a smooth surface portion etched after a grinding process, and has a porosity within the range from 10% to 46%, more preferably, from 20% to 40%. The cathode-side power feeder 113a and the anode-side power feeder 113b have, for example, a ring shape (hollow cylindrical shape). The cathode-side power feeder 113a is provided between the cathode-side separator 112a and the electrolyte membrane 111. The anode-side power feeder 113b is provided between the anode-side separator 112b and the electrolyte membrane 111.

The cathode-side catalyst 114a is provided on a surface of the electrolyte membrane 111, the surface being between the cathode-side power feeder 113a and the electrolyte membrane 111. The cathode-side catalyst 114a is, for example, a platinum catalyst. The anode-side catalyst 114b is provided on a surface of the electrolyte membrane 111, the surface being between the anode-side power feeder 113b and the electrolyte membrane 111. The anode-side catalyst 114b is, for example, a platinum-based catalyst or a ruthenium-based catalyst. The cathode-side catalyst 114a and the anode-side catalyst 114b have, for example, a ring shape.

The normal-pressure hydrogen supply path 115 is a hole passing through the electrolyte membrane 111, the cathode-side separator 112a, and the anode-side separator 112b. The normal-pressure hydrogen supply path 115 is a channel through which normal-pressure hydrogen to be boosted is supplied to the cell unit 110. The normal-pressure hydrogen flow path 116 is in communication with the normal-pressure hydrogen supply path 115. The normal-pressure hydrogen flow path 116 allows the normal-pressure hydrogen to be supplied along the anode-side power feeder 113b. The normal-pressure hydrogen flowing through the normal-pressure hydrogen flow path 116 is converted into hydrogen ions and electrons by electricity at the anode-side catalyst 114b. The hydrogen ions produced by way of this reaction move to the cathode-side catalyst 114a through the electrolyte membrane 111 and combine with electrons to be converted into hydrogen. The resulting hydrogen flows through a high-pressure hydrogen flow path in the cathode-side power feeder 113a.

The normal-pressure hydrogen discharge path 117 is a hole passing through the electrolyte membrane 111, the cathode-side separator 112a, and the anode-side separator 112b. The normal-pressure hydrogen discharge path 117 is a channel into which an unreacted portion of the normal-pressure hydrogen supplied in the above-described manner is discharged, the unreacted portion remaining to be converted into hydrogen ions and electrons. For example, the unreacted portion or the normal-pressure hydrogen is recirculated through the system to be supplied to the cell units 110.

The high-pressure hydrogen discharge path 118 is a channel through which the hydrogen generated in the above-described manner is discharged into the high-pressure hydrogen flow path 119. The high-pressure hydrogen flow path 119 is a hole passing through the electrolyte membrane 111, the cathode-side separator 112a, and the anode-side separator 112b. The high-pressure hydrogen flow path 119 is a channel through which the hydrogen boosted by the cell unit 110 is conveyed to the piston unit 120 and the high-pressure hydrogen outlet 150.

Figure 3:
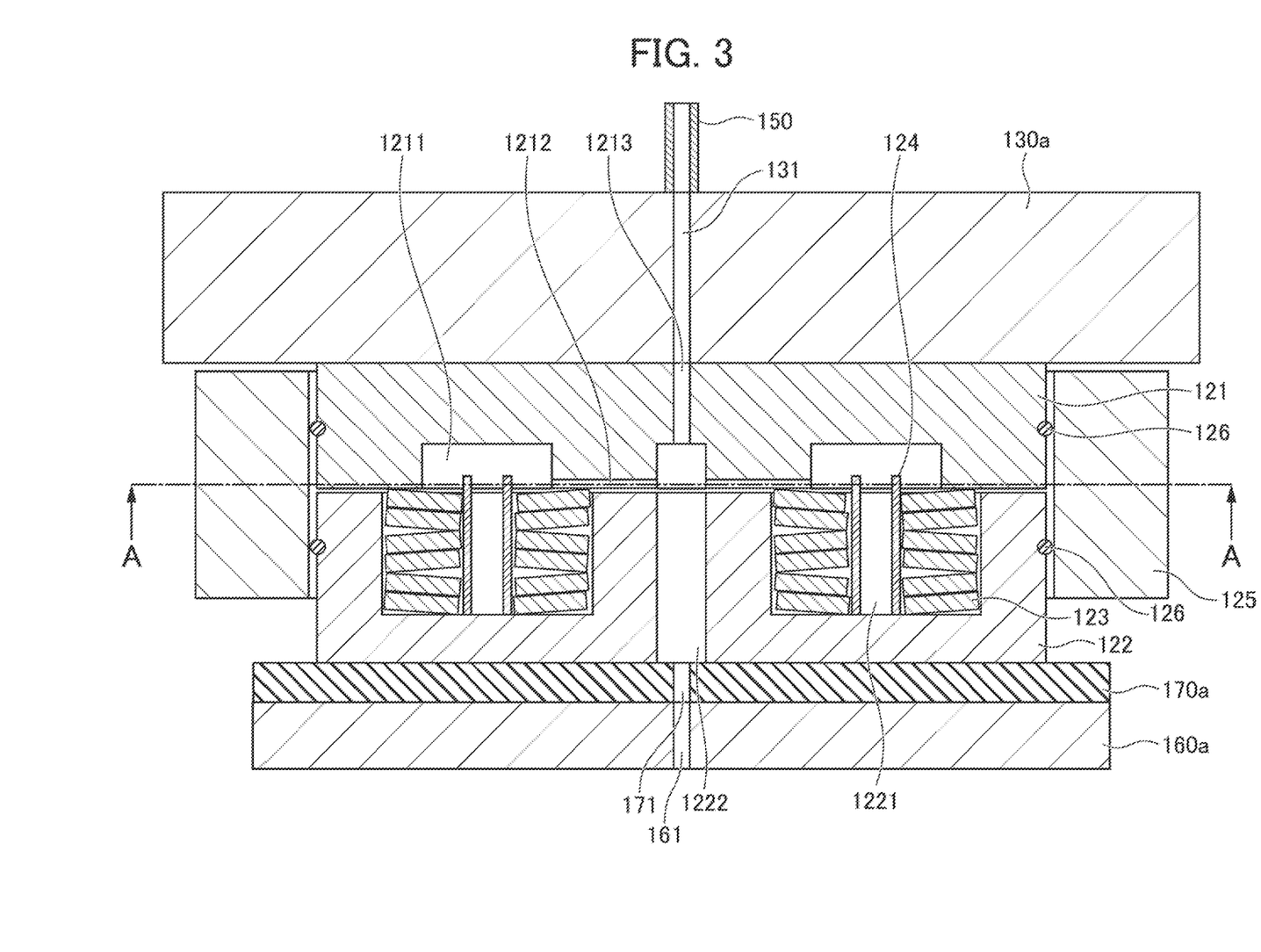
FIG. 3 is an axial cross-sectional view illustrating, the piston unit in FIG. 1, as an example.

The piston unit 120 will be described in detail with reference to FIG. 3. FIG. 3 is an axial cross-sectional view illustrating the piston unit 120 as an example. The piston unit 120 includes, for example, a stationary member 121, a movable member 122, Belleville springs 123, spring shafts 124, a ring member 120, and sealing members 126. The piston unit. 120 may be provided with, on a surface of the movable member 122 facing the end plate 160a, an insulating layer, such as an insulating material or insulating coating, instead of the insulation plate 170a. Alternatively, to further enhance insulating property, the piston unit 120 may be provided with an insulating layer, such as an insulating material or insulating coating, in addition to the insulation plate 170a.

Figure 4:
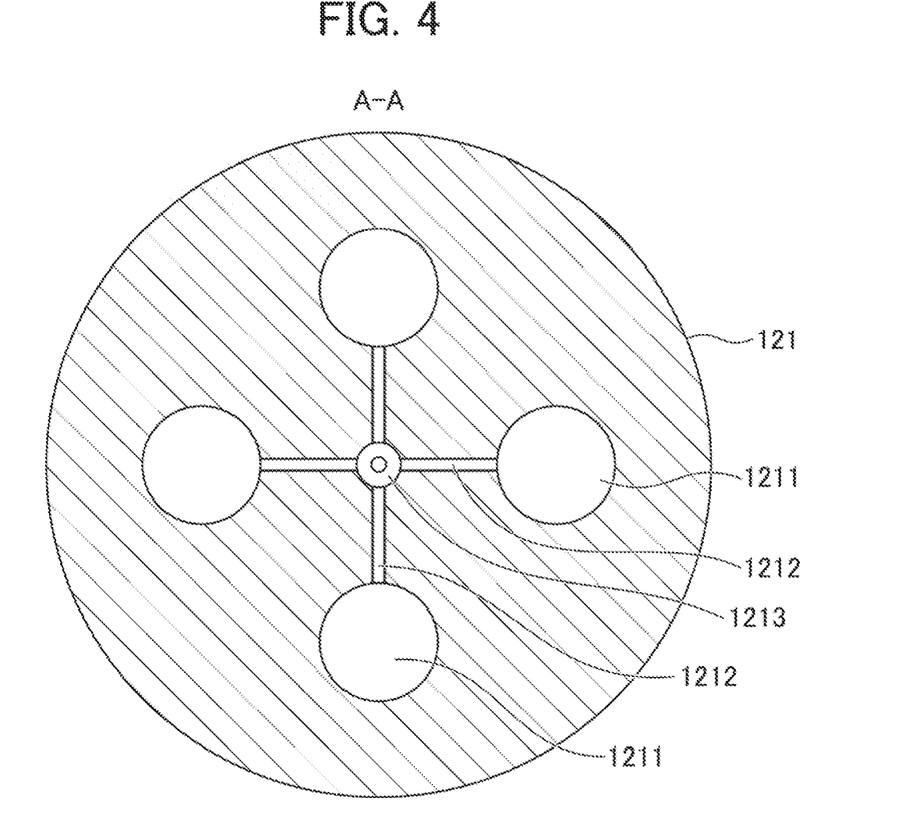
FIG. 4 is a cross-sectional view of a stationary member illustrated in FIG. 3, taken along line A-A in FIG. 3.

The stationary member 121 is disposed between the top plate 130a and the movable member 122. The stationary member 121 is fixed to the top plate 130a. The bottom surface of the stationary member 121 is in contact with the upper surfaces of the Belleville springs 123. A gap is provided between the stationary member 121 and the movable member 122. The stationary member 121 includes, for example, recesses 1211, grooves 1212, and a high-pressure hydrogen flow path 1213. In addition to FIG. 3, reference is made to FIG. 4 to describe the stationary member 121. FIG. 4 is a cross-sectional view of the stationary member 121, taken along line A-A in FIG. 3. The stationary member 121 is an example of a first member.

The recess 1211 is a cylindrical recess. The stationary member 121 has the plurality of recesses 1211 arranged at equal intervals on a circumference. In other words, on the movable members 122, axes of the recesses 1211 are spaced apart from each other by the same angle on the same circumference. The stationary member 121 illustrated in FIGS. 3 and 4 has four recesses 1211. Accordingly, the axes of the adjacent recesses 1211 form an angle of 90 degrees. The number of the recesses 1211 may be less or more than four.

As illustrated in FIG. 4, the grooves 1212 are formed on the stationary member 121 so that the grooves 1212 connect the high-pressure hydrogen flow path 1213 to the recesses 1211. On the stationary member 121, the grooves 1212 correspond to the recesses 1211 on a one-to-one basis. Preferably, each groove 1212 has a cross-sectional area that is at least one half the cross-sectional area of a narrowest portion of the high-pressure hydrogen flow paths in the piston unit 120. This is because the grooves 1212 each having the cross-sectional area corresponding to at least one half the cross-sectional area of the narrowest portion make it easier for hydrogen to enter the recesses 1211 through the grooves 1212. A rate of increase in a pressure in the recesses 1211 can be controlled by limiting an amount of hydrogen flowing into the grooves 1212. As a result, the uneven distribution of load that can be caused by displacement between the Belleville springs can be prevented further reliably. The high-pressure hydrogen flew paths in the piston unit 120 include the high-pressure hydrogen flow path 1213 and a high-pressure hydrogen flow path 1222. For example, when the groove 1212 has a rectangular cross section, the cross-sectional area S1 is given by the following expression: $S1 = d \times w$, where d is a depth and w is a width. In a case where the high-pressure hydrogen flow paths in the piston unit 120 have a circular cross section, the radius of the narrowest portion is represented by r. In this case, it is preferable that the following expression is satisfied: $S1 \geq (\pi r^2)/2$. The cross-sectional shape of the grooves 1212 is not limited to the rectangular shape, out may be a V-shape, a U-shape, a semicircular shape, or any other shape. The cross-sectional shape of the high-pressure hydrogen flow paths is not limited to the circular shape, out may be a polygonal shape, such as a square shape, or any other shape. The groove 1212 is an example of a first fluid path.

The high-pressure hydrogen flow path 1213 is a hole through which high-pressure hydrogen generated by the cell units 110 passes. The high-pressure hydrogen flow path 1213 is in communication with the high-pressure hydrogen flow path 1222 and the high-pressure hydrogen flow path 131.

The movable member 122 is disposed between the stationary member 121 and the insulation plate 170a. The top surface of the movable member 122 faces the bottom surface of the stationary member 121. The movable member 122 is movable in the vertical direction. The movable member 122 includes, for example, spring recesses 1221 and a high-pressure hydrogen flow path 1222. The movable member 122 is an example of a second member.

The spring recesses 1221 are cylindrical recesses in which the Belleville springs 123 are fitted. The number of the spring recesses 1221 is the same as the number of the recesses 1211. Therefore, in the present embodiment, four spring recesses 1221 are provided. Each spring recess 1221 faces a corresponding one of the recesses 1211, and their axes coincide with each other. Each spring recess 1221 and the corresponding recess 1211 facing each other are in communication with each other. The recess 1211 and the spring recess 1221 facing each other form a hydrogen chamber. Into which hydrogen flows from the high-pressure hydrogen flow path 1213 and the high-pressure hydrogen flow path 1222. The pressure of hydrogen in the hydrogen chamber causes a force to set in a direction in which the stationary member 121 and the movable member 122 are pushed apart from each other. The gap between the stationary member 121 and the movable member 122 establishes connection between all the hydrogen chambers, the high-pressure hydrogen flow path 1213, and the high-pressure hydrogen flow path 1222. The hydrogen chamber is an example of a fluid chamber.

The high-pressure hydrogen flow path 1222 is a cylindrical hole through which the high-pressure hydrogen generated by the cell units 110 passes. The high-pressure hydrogen flow path 1222 is in communication with the high-pressure hydrogen flow path 1213 and a high-pressure hydrogen flow path 171.

Each of the Belleville springs 123 is a disc spring sandwiched between the bottom surface of the spring recess 1221 of the movable member 122 and the bottom surface of the stationary member 121. The Belleville springs 123 press, with their elastic force, the bottom surfaces of the spring recesses 1221 and the bottom surface of the stationary member 121. Thus, the Belleville springs 123 exert their elastic force in the direction in which the stationary member 121 and the movable member 122 are pushed apart from each other. Since the stationary member 121 is fixed, the Belleville springs 123 press the movable member 122 downward with their elastic force. Each Belleville spring 123 illustrated in FIG. 3 has a hole in its central portion. Each Belleville spring 123 is prevented from moving in the horizontal direction by the side surface of the spring recess 1221 and the spring shaft 124. The piston unit 120 is configured such that the movable member 122 is pressed downward by the elastic force of the Belleville springs 123 and the pressure of hydrogen in the hydrogen chambers.

Each spring shaft 124 is fixed to the center of the bottom of the corresponding spring recess 1221. The piston unit 120 includes the spring shafts 124 and the spring recesses 1221 on a one-to-one basis. The spring shaft 124 is a hollow cylindrical member passing through the hole in the Belleville spring. The spring shafts 124 illustrated in FIG. 3 are hollow, but they do not have to be hollow.

The ring member 125 is a ring-shaped member provided to surround the stationary member 121 and the movable member 122.

The piston unit 120 is provided with the two sealing members including, for example, a sealing member 126a and a sealing member 126b. The sealing member 126a is, for example, an O-ring provided to surround the stationary member 121. The sealing member 126b is, for example, an O-ring provided to surround the movable washer 122. The sealing members 126 provide sealing for preventing hydrogen that has passed through the gap between the stationary member 121 and the movable member 122 from leaking out beyond the sealing members 126.

As illustrated in FIG. 3, the top plate 130a has a high-pressure hydrogen flow path 131. The high-pressure hydrogen flow path 131 is a hole through which the hydrogen boosted by the cell units 110 passes. The high-pressure hydrogen flow path 131 is in communication with the high-pressure hydrogen outlet 150 and the high-pressure hydrogen flow path 1213.

The end plate 160a has a high-pressure hydrogen flow path 161. The high-pressure hydrogen flow path 161 is a cylindrical hole through which the high-pressure hydrogen generated by the cell units 110 passes. The high-pressure hydrogen flow path 161 is in communication with the high-pressure hydrogen flow path 171 and the high-pressure hydrogen flow path 119. The insulation plate 170a has the high-pressure hydrogen flow path 171. The high-pressure hydrogen flow path 171 is a cylindrical hole through which the high-pressure hydrogen generated by the cell units 110 passes. The high-pressure hydrogen flow path 171 is in communication with the high-pressure hydrogen flow path 1222 and the high-pressure hydrogen flow path 161.

The electrochemical compressor or the embodiment includes the stacked cell units that cause the electrochemical reaction, the communication holes that establish communication between the cell units and allow supply gas to flow, the communication holes that allow the high-pressure gas to flow, the plates that provide electrical insulation, the piston structure that transmits the pressure of the high-pressure gas to press the cell units, and the tie rod that fastens the foregoing components as a whole. In the embodiment, the piston structure has the grooves on a contact surface contacting with the Belleville springs so that the flow of the high-pressure gas is not interrupted by the contact surface and the Belleville springs. This configuration makes it possible to evenly distribute the high-pressure gas to the spaces inside the piston structure where elastic bodies, such as the Belleville springs, are provided. The electrochemical hydrogen compressor 100 of the embodiment has the grooves 1212 connecting the high-pressure hydrogen flow path 1213 to the recesses 1211. Therefore, even in a state in which the Belleville springs 123 block the gap between the stationary member 121 and the movable member 122 and makes it difficult for hydrogen to enter the hydrogen chambers through the gap, the grooves 1212 are unlikely to be blocked. Thus, even in this state, hydrogen in the high-pressure hydrogen flow path 1213 can flow into the hydrogen chambers through the grooves 1212. As a result, the piston unit 120 of the embodiment can prevent the load balance from being disrupted and can properly press the cell units 110. When the electrochemical hydrogen compressor 100 is stopped and hydrogen in the high-pressure hydrogen flow path 1213 is depressurized, the piston unit 120 of the embodiment can properly remove the load of the Belleville springs 123 because hydrogen in the hydrogen chambers flows through the grooves 1212 into the high-pressure hydrogen flow path 1213.

In the electrochemical hydrogen compressor 100 of the embodiment, the grooves 1212 are formed on the bottom surface of the stationary member 121. The Belleville springs 123 are in contact with the bottom surface, and accordingly, do not block the grooves 1212.

Figure 5:
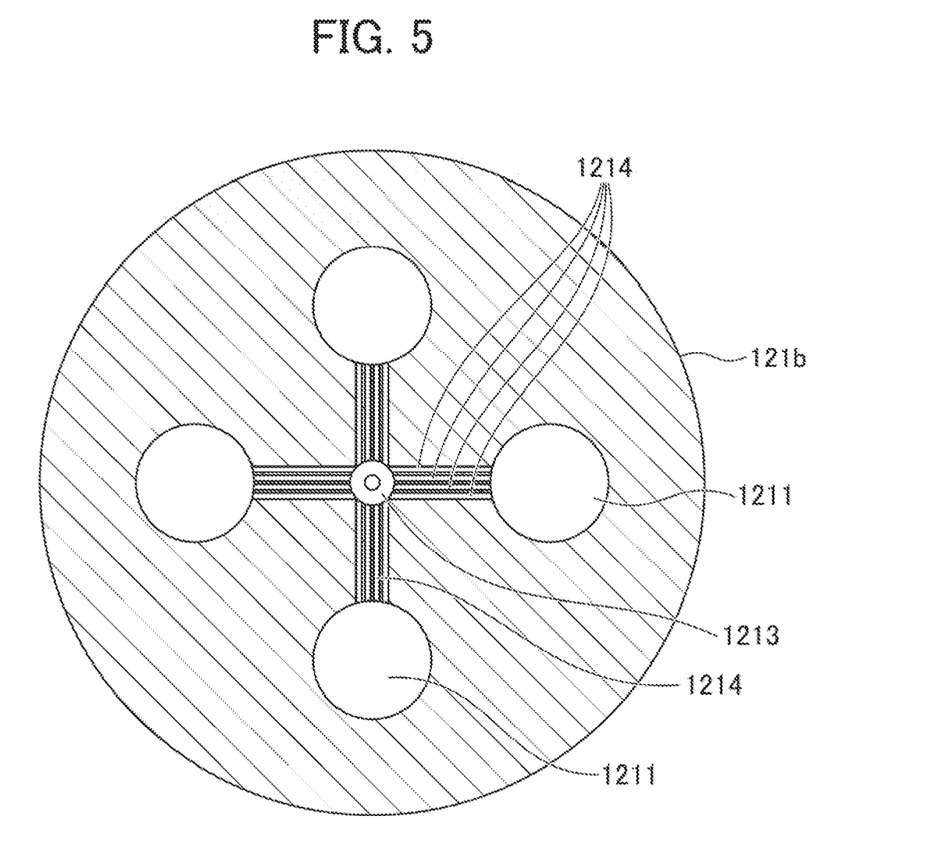
FIG. 5 is a cross-sectional view illustrating a modification of the stationary member.

The above embodiment can be modified as follows. The stationary member of the embodiment may be configured as illustrated in FIG. 5. FIG. 5 is a cross-sectional view of a stationary member 121b, which is a modification of the stationary member 121. The stationary number 121b has grooves 1214 instead of the grooves 1212. Like the grooves 1212, the grooves 1214 connect the high-pressure hydrogen flow path 1213 to the recesses 1211. However, the stationary member 121b has two or more grooves 1214 for each of the recesses 1211. The two or more grooves 1214 are parallel with each other, for example. On the stationary member 121b illustrated in FIG. 5, four grooves 1214 are formed for one recess 1211. Note that the number of grooves 1214 per one recess 1211 is not limited to four.

Preferably, the sum of cross-sectional areas of the grooves 1214 connected to one recess 1211 is at least one half the cross-sectional area of the narrowest portion of the high-pressure hydrogen flow paths in the piston unit 120. For example, in a case where the grooves 1214 fill have an identical cross-sectional shape, it is preferable that the following expression is satisfied: $n \cdot S2 \geq (nr^2)/2$, where n is the number of the grooves 1214 connected to one recess 1211 and S2 is the cross-sectional area of each groove 1214. The groove 1214 is an example of the first fluid path. The electrochemical hydrogen compressor of the present modification has the two or more grooves 1214 per one recess, as described above. Even if some of the grooves 1214 are blocked for some reason, hydrogen flows into the hydrogen chamber from the other grooves 1214. In addition, since a contact cross-sectional area between the stationary member 121b and the Belleville springs 123 is reduced, even if the stationary member 121b and the Belleville springs 123 adhere to each other for some reason, the stationary member 121b and the Belleville springs 123 can be easily separated from each other by increasing the pressure in the recesses 1211 by causing hydrogen to flow from the high-pressure hydrogen flow path 1213 into the recesses 1211.

Figure 6:
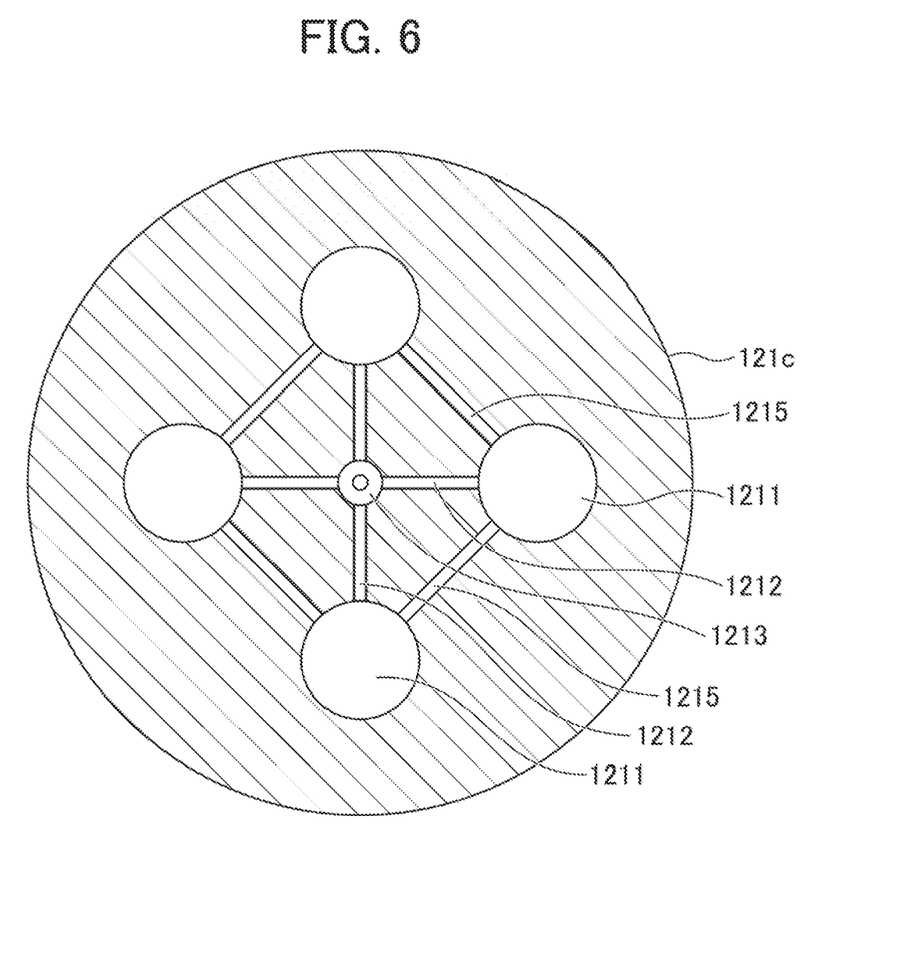
FIG. 6 is a cross-sectional view illustrating a modification of the stationary member.

The stationary member of the embodiment may be configured as illustrated in FIG. 6. FIG. 6 is a cross-sectional view of a stationary member 121c, which is a modification of the stationary member 121. The stationary member 121c has grooves 1215 in addition to the grooves 1212. Each groove 1215 connects one recess 1211 to another recess 1211. In FIG. 6, each recess 1211 is connected to two closest recesses 1211 via two grooves 1215. Accordingly, in this case, the number of grooves 1215 is the same as the number of recesses 1211. The groove 1215 is an example of a second fluid path. As can be seen, the electrochemical hydrogen compressor of the embodiment has the grooves 1215 each connecting one recess 1211 to another recess 1211, so that hydrogen in the plurality of recesses 1211 has a uniform pressure.

The stationary member of the present modification may have, instead of the grooves 1215, a plurality of grooves that are parallel to each other, like the grooves 1214. The plurality of parallel grooves connect ore recess 1211 to another recess 1211. The stationary member of the present modification may have the grooves 1214 and the grooves 1215.

The Belleville springs 123 of the piston unit of the embodiment may be replaced with other elastic bodies exerting art elastic force, such as springs of a different type.

In the above embodiment, the stationary member has the grooves. However, the movable member of the embodiment may have grooves instead of or in addition to the stationary member. In this case, for example, the grooves of the movable member are formed to face the location of the grooves of the stationary member of the above embodiment.

In the above embodiment, the stationary member may have holes instead of or in addition to the grooves. For example, the stationary member may have holes instead of or in addition to the grooves 1212 or 1214. The holes connect the high-pressure hydrogen flow path 1213 to the recesses 1211. Like the grooves 1212 or 1214, the holes serve as paths through which hydrogen in the high-pressure hydrogen flow path 1213 flows into the recesses 1211. The hole is an example of the first fluid path. Preferably, the sum of cross-sectional areas of the groove(s) and the hole(s) that connect one recess 1211 to the high-pressure hydrogen flow path 1213 is at least one half the cross-sectional area of the narrowest portion of the high-pressure hydrogen flow paths in the piston unit 120, as in the case where only the grooves are formed. The stationary member may have holes instead of or in addition to the grooves 1214 or 1215. Like the grooves 1215, the holes each connect one recess 1211 to another recess 1211. The hole is an example of the second fluid path.

In the above embodiment, the apparatus configured to boost hydrogen has been described. However, the electrochemical compressor of the embodiment may be configured as an apparatus that boosts a pressure of a gas other than hydrogen or a pressure of any other fluid. In this case, the configuration of the cell units is determined according to the fluid to be boosted.

The electrochemical compressor of the embodiment may be configured as an apparatus that produces hydrogen by water electrolysis and boosts the produced hydrogen. In this case, the electrochemical compressor supplies water to the cell units. The cell units generate hydrogen by water electrolysis.

The embodiment described above is a mere example, and is not intended to limit the scope of the present disclosure. The embodiment of the present disclosure can be worked in various ways without deviating from the spirit of the present disclosure.

EXPLANATION OF REFERENCE NUMERALS

100: Electrochemical Hydrogen Compressor
110: Cell Unit
111: Electrolyte Membrane
112a: Cathode-Side Separator
112b: Anode-Side Separator
113a: Cathode-Side Power Feeder
113b: Anode-Side Power Feeder
114a: Cathode-Side Catalyst
114b: Anode-Side Catalyst
115: Normal-Pressure Hydrogen Supply Path
116: Normal-Pressure Hydrogen Flow Path
117: Normal-Pressure Hydrogen Discharge Path
118: High-Pressure Hydrogen Discharge Path
119, 131, 161, 171, 1213, 1222: High-Pressure Hydrogen Flow Path
120: Piston Unit
121: Stationary Member
122: Movable Member
123: Belleville Spring
124: Spring Shaft
125: Ring Member
126a, 126b: Sealing Member
130a: Top Plate
130b: Bottom Plate
140: Tie Rod
150: High-Pressure Hydrogen Outlet
160a, 160b: End Plate
170a, 170b: Insulation Plate
1211: Recess
1212, 1214, 1215: Groove
1221: Spring Recess
P: Power Supply

What is claimed is:

1. An electrochemical compressor comprising:
a first member;
a second member facing the first member, wherein the first member and the second member have a gap between the first member and the second member;
an elastic body that exerts an elastic force in a direction in which the first member and the second member are pushed apart from each other, and thereby presses a stack of electrochemical cells in each of which a gas supplied thereto is boosted by being moved by electricity from one side to an opposite side of a solid polymer electrolyte membrane as a partition wall;
a fluid chamber that has the elastic body disposed therein and receives the boosted gas flowing thereinto, the fluid chamber allowing the boosted gas to apply a pressure in the direction in which the first member and the second member are pushed apart from each other; and a first fluid path comprising a groove formed on a surface of at least one of the first member or the second member, the first fluid path connecting the fluid chamber to a flow path into which the boosted gas is discharged from the electrochemical cells, the first fluid path formed on a surface being pressed by the elastic body, wherein the electrochemical compressor introduces the boosted gas into the fluid chamber, and presses the first member and the second member apart from each other and presses the stack of electrochemical cells.

2. The electrochemical compressor according to claim 1, wherein the fluid chamber comprises a plurality of fluid chambers, and wherein the first fluid path comprises a plurality of first fluid paths each connecting the flow path to a corresponding one of the plurality of fluid chambers.

3. The electrochemical compressor according to claim 1, wherein the fluid chamber comprises a plurality of fluid chambers, the electrochemical compressor further comprising a second fluid path connecting the fluid chambers to each other.

4. The electrochemical compressor according to claim 1, wherein the fluid chamber comprises a plurality of fluid chambers, and wherein the first fluid path connects the flow path to one of the plurality of fluid chambers, and a cross-sectional area of the first fluid path is at least one half a cross-sectional area of a narrowest portion of the flow path, or wherein the first fluid path comprises a plurality of first fluid paths each connecting the flow path to a corresponding one of the plurality of fluid chambers, and a sum of cross-sectional areas of the first fluid paths is at least one half a cross-sectional area of a narrowest portion of the flow path.

* * * * *